United States Patent Office 3,285,758
Patented Nov. 15, 1966

3,285,758
BASIC REFRACTORY COMPOSITIONS FOR INTERMEDIATE TEMPERATURE ZONES
Robert W. Limes and David Ponzani, Cleveland, Ohio, assignors to Republic Steel Corporation, Cleveland, Ohio, a corporation of New Jersey
No Drawing. Filed May 5, 1965, Ser. No. 453,469
22 Claims. (Cl. 106—58)

This application is a continuation-in-part of copending application Serial No. 277,467 filed May 2, 1963, now abandoned.

This invention relates to basic refractory compositions. More specifically, it relates to basic refractory compositions which are bonded by phosphates.

The most common bonding of ceramic materials used for refractory purposes, such as in furnace walls, is that produced by firing or heating to produce either a glassy bond or mineralization to form crystal bonding. In recent years, unfired or so-called chemical bondings have become more widely used in refractories. This permits the elimination of the costly firing step in normal processing and uses instead the heat or high temperature of the furnace in which the refractory is installed. Such refractories can be set without drying and have the advantage of being applicable in large sections with the elimination of time-consuming and expensive bricklaying operations. Some of these materials can be set without drying and others must be dried before sufficient set develops in order to achieve satisfactory strength.

One disadvantage of such chemically bonded refractory compositions which use the furnace heat to effect setting of the refractory material is the fact that there is always a temperature gradient with a relatively high temperature on the hot face of the furnace wall and a relatively low temperature on the cold, outside surface. At an intermediate zone within the wall there is an intermediate temperature which effects only a low strength in the resultant refractory in that zone. This intermediate temperature is sufficient to destroy the cold chemical bond but is insufficient to form a strong ceramic bond. Therefore, cracking often occurs behind the hot face of the wall where this low strength area exists and the wall fails by peeling rather than by fluxing or melting away.

One commercial attempt to avoid this loss of strength in the intermediate temperature zone was the use of phosphate-bonded alumina refractories. These are generally prepared by reacting alumina with phosphoric acid to form an aluminum phosphate either by separately preparing such material or forming in situ. Although phosphoric acid prepared phosphates work well with fire clay and alumina aggregates, they are not satisfactory with basic materials such as magnesia. With increased emphasis being placed on basic refractories for steel-making furnaces, the need for stronger bonding to higher temperatures in this type of material has become increasingly important.

The use of gunning as a technique for applying refractory aggregates is being more widely used. In this method the refratcory aggregate is carried in an airstream to a nozzle where it is mixed with water, and the wetted, resultant mixture is blown onto the furnace wall. Castable and cement type mixes lend themselves well to this method of application. In cases where setting time is not important, a refractory aggregate and chemical bonding material may be mixed with water before it is entrained in the airstream and blown through the nozzle. This is the so-called slurry mix. However, if the resultant mix is too dry, excessive rebound from the wall occurs with increased waste and cost of installation. Moreover, a dry mix very often results in poor density and segregation of the refractory aggregate on the wall. In contrast, if the mix is too wet, slumping occurs which limits the amount or thickness of material that can be applied to the wall.

To date, there has been little success in overcoming the above-described loss of strength in basic refractories at the intermediate temperature zones. This is particularly true with gunning mixes which require carefully controlled setting conditions. At present, the bonding agents in basic gunning mixes are sodium silicate, magnesium sulphate and magnesium oxychloride cements. However, none of these materials set sufficiently fast. Attempts to apply the phosphate bonding principle to basic magnesia aggregates have not been satisfactory. Phosphoric acid reacts violently with magnesia to produce excessive heat which turns the moisture to steam and disrupts the body structure of the refractory. Magnesium phosphate salts give poor bonding strength.

Monoammonium phosphate has been proposed as a bonding agent for magnesia aggregates. However, while this compounud promotes a very fast setting, it can be used in gunning mixes only where the mix is to be applied in very thin layers. This is because the fast reaction promoted by the monoammonium phosphate generates excessive amounts of heat resulting in vaporization of the moisture in the mix at such a high rate that, if applied in any but thin layers, this moisture vapor will cause fissions or ruptures or bloating in the resulting product. Attempts to slow down the fast reaction by diluting the monoammonium phosphate results in loss of strength in the final product.

In contrast diammonium phosphate is not very effective as a setting agent in gunning mixes, particularly when applied to cold walls. Where the walls are at temperatures of 500° F. or higher, depending on the thickness of layer to be applied, diammonium phosphate can be used, provided the wall temperature is high enough to accommodate the thickness of layer applied. Even mixtures of monoammonium phosphate and diammonium phosphate set too quickly and thereby generate excessive amounts of heat that cannot be dissipated quickly enough to avoid the fissions, ruptures and bloating described above.

In accordance with the present invention, it has now been found that satisfactory chemical bonding can be effected in basic refractory compositions, whether to be used as gunning mixes, or pressing or ramming mixes, by the use of a solution of ammonium phosphates containing orthophosphate, pyrophosphate and polyphosphates, which polyphosphates include tripolyphosphate, tetrapolyphosphate and higher polyphosphates.

With such a combination, gunning mixes are prepared which set quickly enough to retain the mix on the wall without slumping and still can be applied in thicknesses of 4–8 inches without any fissions, ruptures or bloating. In such gunning mixes, the setting reaction and the resultant heat generation is appropriately controlled so that the heat is dissipated through the aggregate at such a rate that there is not the fast vaporization of moisture which causes the fissions, ruptures, and bloating described above. Furthermore, even with pressing and ramming mixtures, the cold and hot modulus strengths resulting from the use of this particular mixture of phosphates is much improved over the corresponding properties obtained with diammonium phosphate. Monoammonium phosphate causes such fast setting that it is impractical to use it in pressing and ramming mixes.

Particularly preferred for this purpose are aqueous solutions containing as much ammonium polyphosphate as can be dissolved. While the polyphosphate content gives a higher content of $P_2O_5$ in the resultant mixture, it has been found that the ammonium component is also essential since phosphorus oxide components alone, such as phosphorus pentoxide do not give the beneficial results effected by the practice of this invention. It has been found that the ammonium phosphate mixture advantageous for the purpose of this invention has the composition of approximately 35–40% orthophosphate, 45–50% pyrophosphate, 9–11% tripolyphosphate and 2–5% higher polyphosphates. Such compositions show about 8–12% ammoniacal nitrogen and about 30–35% total $P_2O_5$.

In the refractory compositions of this invention, the magnesia content can range from 1 to 100% by weight of the aggregate portion and the phosphate content (calculated as $P_2O_5$ content) in the developed composition can range from 0.5 to 6%. While the phosphate content is introduced as ammonium phosphates, the resulting ultimate product has lost substantially all of the ammonium content since ammonia is given off during the various drying and/or firing operations.

The ammonium phosphate solution useful in the practice of this invention can be prepared by the reaction of polyphosphoric acid with concentrated ammonium hydroxide. The polyphosphoric acid is 115 percent phosphoric acid and has a $P_2O_5$ content of approximately 83.2%. This is distributed as 5% orthophosphoric acid, 16% pyrophosphoric acid, 17% triphosphoric acid, 16% as tetraphosphoric acid and 46% higher polymer acid. The polyphosphoric acid can be represented by the formula

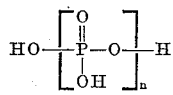

When $n$ equals 1, this formula represents orthophosphoric acid. When $n$ equals 2, the formula represents pyrophosphoric acid. When $n$ equals 3, it represents triphosphoric acid. When $n$ equals 4 it represents tetraphosphoric acid, and when $n$ is higher than 4, it represents the higher polymer acids.

When the ammonium hydroxide is reacted with this polyphosphoric acid, some of the hydroxy groups of this formula are converted to $-ONH_4$ radicals. Since the water present in the ammonium hydroxide solution converts some of the polymeric acid to the ortho and pyro forms, the ratios of these forms in the ammonium phosphate product become higher than in the initial acid form. For most of the purposes of this invention it is desirable to have as high as possible the concentration of ammonium polyphosphates. The various ammonium phosphates can be represented by substituting the ammonium radical ($NH_4$) for the H of one or more of the hydroxy groups shown in the formula.

For example, if approximately 41 parts of the polyphosphoric acid (115% $H_3PO_4$) is reacted with approximately 73 parts of 35% ammonium hydroxide, the resultant ammonium phosphate solution has a $P_2O_5$ content of approximately 34%, an ammoniacal nitrogen content of approximately 10%, and a water content of approximately 50%. Some of the water has been used to break down the polymer structure and give higher proportions of the orthophosphoric acid and pyrophosphoric structures than were present originally. The concentrations are approximately those cited above as suitable for the practice of this invention.

The indicated ratios of the various components of the above-indicated solution are in equilibrium at the concentration described. However, while the above concentrations are desirable for most purposes in the practice of this invention such as in aggregate mixes to be used for pressing and ramming, it is generally desirable when the mix is to be applied by gunning that additional water be present to give a more suitable consistency for this type of application. For most gunning operations the addition of as much as an equal volume of water is satisfactory. However, where the mix is being applied to a very hot wall and the vaporization loss is very rapid as much as two volumes of water per volume of ammonium phosphate solution can be added. This gives approximately 50–75 percent by weight of water in the resultant mixed ammonium phosphate solution.

This extra water is added advantageously shortly before the mix is to be applied so as to minimize the shift in the equilibrium ratio of the phosphate components. Generally, the dilution can be made at the beginning of the day for the solution to be used during that day, although diluted solution standing for approximately 24 hours can be used satisfactorily.

Where reference is made to shaping or forming an aggregate mix before drying, it is intended to include shaping as effected in the application by gunning of an aggregate layer on a wall or other surface.

For purpose of simplification, the amount of ammonium phosphate solution desirable for the purpose of this invention is generally indicated as 4–25 parts of solution per 100 parts of aggregate, or in some cases 5–25 parts of solution. This is based on a $P_2O_5$ content of approximately 34.2% in the ammonium phosphate solution. Where the $P_2O_5$ content varies from the 34.2 value, the amount of solution is adjusted to give the equivalent $P_2O_5$ content. This range can also be stated as being equivalent to about 1.35–8.55 parts by weight of $P_2O_5$ content per 100 parts of aggregate.

Particularly suitable ammonium phosphate for the purpose of the invention is a commercial product known as sequestered phosphatic solution, which is used primarily as an agriculture fertilizer. Such solutions contain orthophosphate, pyrophosphate and polyphosphates. A typical analysis shows 10.2% ammoniacal nitrogen, and 34.2% total $P_2O_5$. The $P_2O_5$ distribution is approximately 38% as orthophosphate, 48% as pyrophosphate, 10% as tripolyphosphate, 3% as tetrapolyphosphate and 1% as higher polyphosphates.

This commercial material has approximately 4% of impurities, which do not adversely affect its use in the practice of this invention. These impurities comprise approximately 1.7% sulfuric acid, 0.6% iron, 0.5% aluminum and 0.05% fluorine. This commercial product also contains roughly about 50% water.

When firebrick aggregate and fireclay are used (varying in range from 100% of one to 100% of the other), a typical satisfactory composition is made by using 95–99 parts of graded firebrick aggregate and fireclay, 1–5 parts of lightly calcined or dead-burned magnesia and 5–25 parts of the sequestered phosphatic solution. In such compositions, the rate of setting is controlled by the degree of calcination and the fineness of the magnesia. The appropriate amount of sequestered phosphatic solution is determined somewhat on the forming technique to be used, a low percentage being used for pressing and a high percentage for casting.

Since both magnesia and the phosphatic solution are fluxes for the fireclay aggregate, they are desirably kept to a minimum while still using sufficient to give the necessary strength and refractoriness desired. In some cases the sequestered phosphatic solution is diluted, particularly in applications where it is desirable to use high proportions of liquid material for imparting proper temper or consistency to the resultant mix.

In compositions in which graded raw dolomite is used, typical suitable compositions are in the range of 50–90 parts of graded raw dolomite, 10–50 parts of lightly calcined or dead-burned magnesia and 6–12 parts of the sequestered phosphatic solution. As previously pointed out, higher magnesia additions improve the properties developed in these compositions, but economics determine that as low a proportion should be used as will give the desired property.

In both of the above types of compositions, other aggregates can be substituted for either the firebrick or the raw dolomite, such as zircon, zirconia, alumina, etc. If 100% of graded magnesia is to be used, a proportion of 4–12 parts of a sequestered phosphatic solution is found to be desirable.

It is found that the magnesia improves the phosphate bonding and decreases the firing shrinkage that is normally encountered when raw dolomite is used. Furthermore, it improves the refractoriness of the resultant product.

Although magnesia is preferred, it is possible to substitute calcined dolomite, which has a substantial magnesia content, for the magnesia or for a part of the magnesia. Sometimes the calcined dolomite reacts to give off excessive heat which, unless controlled, causes undesirable steam formation. However, this can be controlled by having present in the mixture sufficient relatively inert aggregate, such as raw dolomite, for dissipation or absorption of the heat.

When such combinations are used, preferred ranges are 10–50 percent of calcined dolomite and 50–90 percent raw dolomite or other relatively inert aggregate. With such combinations, 6–15 parts of sequestered phosphatic solution is advantageously used per 100 parts of aggregate.

When magnesia is used with alumina, silica, zircon or zirconia, preferred ranges are in the order of 5–50 percent magnesia and 50–95 percent of alumina, silica, zircon and/or zirconia. In such cases 6–12 parts of sequestered phosphatic solution per 100 parts of aggregate is desirable.

When a fused, cast grain aggregate or a major portion of magnesia and a minor portion of chrome ore or alumina is used, 4–12 parts of sequestered phosphatic solution is advantageously used.

Moreover, where references are made above to preferred proportions of magnesia, etc., it has been pointed out above that the advantages of this invention can be had with any aggregate mixture in which there is at least one percent of magnesia, either as such or as a component, such as in calcined dolomite or in the fused cast aggregates referred to above.

The compositions of this invention set hard within a few minutes, generally about 4–5 minutes, merely upon mixing and need no special conditions or treatment except for drying to remove water. This can be done most effectively at 350° F. for about 8 hours or more, with higher temperatures being more suitable for bulkier pieces. However, temperatures as low as 250° F. are also suitable over longer periods. Higher temperatures can also be used particularly where the mix is being applied directly to a heated furnace wall.

The particle size of the aggregate is not critical and is selected according to particular ultimate density and other properties desired, type of materials being used and the ultimate use or method of application. Where the composition is to be applied as a gunning mix, the aggregate is obviously selected as of appropriate size to flow easily through the gun.

However, particularly suitable for gunning operations has been found to be a particle size distribution of the aggregate of 60% in the range of 6 to +28 mesh (Tyler) and 40% of −100 mesh. For casting, ramming or pressing a particle size distribution of 10% of −3 to +6 mesh, 55% of −6 to +28, and 35% of −100 mesh has been particularly suitable. These are the particle sizes used in the examples given below except where indicated otherwise. It is generally permissible to have 5–15% of aggregate in the intermediate size range or as much as 5% of a size larger than the maximum size indicated.

In preparing mixes of the various ingredients to produce the refractories of this invention, the phosphate solution is added in sufficient amounts to "temper" the mixture for casting or pressing the composition into brick or other desired form. Where the amount of phosphate components are more than would be desired in the ultimate composition, the phosphate solution can be diluted so as to give the proper consistency to the mix for the casting or pressing operation.

In many cases, as pointed out above, it is desirable to apply refractory coatings for repair purposes of "gunning" a mix onto the area to be repaired. Standard "guns" are available in the industry for this purpose. Obviously, in such a method of application, it is necessary that the refractory mix be capable of setting immediately in order to prevent flow or dropping off of the mix from the walls to which they are applied. Therefore, since fast-setting mixes must be applied immediately upon mixing with water, "guns" have been developed and are available commercially which are capable of mixing water with a dry mix just prior to shooting the resultant wet mix to the desired areas. In order to obtain the desired fast setting, it is necessary to add a setting agent to the basic refractory materials. However, if the setting agent acts too quickly, the mix will harden in the gun. If it acts too slowly, the mix will flow or fall off of the area to which it has been applied. The sequestered phosphatic solutions are especially effective for this purpose.

For the practice of this invention, gunning conditions and techniques normally used for such purposes are found satisfactory. Typical of such conditions and techniques are those described in U.S. Patent 3,047,411.

In the present invention it has been found appropriate to substitute the phosphate solution in place of the water and thereby have the phosphate mixed with the dry components just at the instant at which the mix is shot from the gun. This has been found to work most satisfactorily and various refractory coatings of this invention can be applied in such a manner. Stainless and other steels resistant to corrosion in the presence of the phosphate solution are advantageously used in the manufacture of the gun chambers.

It is generally desirable to use the aggregate components in at least two different grain sizes so that the resultant mixture can be obtained in the maximum packing density. Such graded grain sizes of both magnesia and raw dolomite are available commercially. The magnesia can be a high grade magnesia, or a reclaimed basic refractory, or magnesite with or without chrome ore, or a spinel which comprises magnesia and alumina. Particularly suitable and economical is a fused, cast grain of 60% magnesia and 40% chrome ore, available as salvaged brick. Also particularly suitable is a spinel of 70% magnesia and 30% alumina.

In some cases, it is desirable to use such a large amount of raw dolomite that the resultant gunned refractory wall lining will disintegrate from hydration when the temperature is decreased. For example, such a lining in open hearth slag pockets, where silica stone has previously been used as a false wall, makes a natural parting layer for the removal of slag.

The refractory compositions of this invention can be cast in brick form, or as monolithic structures, or as linings on walls, etc. The brick can be vibration cast, pressed or rammed according to well-known techniques. Monolithic structures can be rammed or vibration cast, and linings are advantageously gunned. These compositions are particularly suitable for use in open hearth and electric furnaces.

In the present invention, the magnesia in the aggregate is reacted with the ammonium ortho, pyro and polyphosphates to produce chemical bonding. Other components can be present in the aggregate, for example, those which cause mineralization of the magnesia, that is, densify and promote crystal growth and thereby improve the reaction of the magnesia. Typical of such other mineralizing components are dolomite, lime, chrome ore, alumina, zircon, zirconia, etc.

The phosphate bonding can be accomplished with either lightly calcined or dead-burned magnesia, but for refractory use, the aggregate is preferably dead-burned. As is well known in the industry, dead-burning is effected by calcining above about 2700° F. and light burning or light calcining is effected at about 1800–2000° F. Dead-burned magnesia is often referred to as periclase. Generally, the magnesia is dead-burned in admixture with any modifier that is to be used, although in some cases such as with dolomite, the components are sometimes burned separately.

For example, the magnesia aggregate can be periclase, mixtures of periclase and burned dolomite, mixtures of periclase and chrome ore, or magnesia aggregate prepared by adding dolomite, lime, chrome ore, alumina, zircon, zirconia, etc., to the magnesia prior to dead-burning. As previously stated, these additions promote mineralization of the periclase and enhance the bonding effect of the phosphates. Examples are a fused, cast grain containing 60% magnesia and 40% chrome ore, a magnesia grain containing 12% lime and 5% silica where the latter are burned into the grain during dead-burning, or a similar dead-burned periclase with zircon or zirconia additions. With chrome ore and burned dolomite as much as 50 or 60% can be used depending on the properties desired and the purpose of the product. With the other modifiers generally less than 30% is desirable and in most cases, much lower amounts achieve the desired effect and are, therefore, more practical. However, regardless of the amount of such modifiers present, the phosphate bonding is essentially with the magnesia present even if there is as little as 1% magnesia in the aggregate. In the examples described below dead-burned magnesia is used.

The particle size of the aggregate is not critical and is selected according to the particular ultimate density and other properties desired, the types of materials being used and the ultimate use or method of application. For example, for casting, ramming or pressing, a particle size distribution of 10% of −3 to +6 mesh (Tyler), 55% of −6 to +28, and 35% of −100 mesh has been particularly suitable. These are the particle sizes used in the examples given below except where indicated otherwise. It is generally permissible to have a small portion of the aggregate in the intermediate size range or a small portion of a larger size than the maximum size indicated. In the aggregate mixture, only enough water is used to provide lubricity for pressing.

The invention is best illustrated by the following examples. These examples are intended merely by way of illustration and are not intended in any way to restrict the scope of the invention or the manner in which it can be practiced. Throughout the examples and throughout the specifications, unless specifically provided otherwise, parts and percentages are given as parts by weight and percentages by weight. In the following examples the total aggregate represents 100 parts and the various ammonium phosphate solutions represent the number of parts added to the 100 parts of aggregate.

*Example I*

Two mixes are prepared from 98% magnesia and sequestered phosphatic solution using 100 parts of aggregate having particle size distribution as described above. In one case the refractory mix is pressed and in the other it is rammed. The results are summarized in Table I together with comparative test results of a commercial brick made from a chemically bonded 60% magnesia and 40% chrome ore without any ammonium phosphate.

TABLE I

|  | Comm. Brick | 98% MgO Pressed | 98% MgO Rammed |
| --- | --- | --- | --- |
| Parts Sequestered Phosphatic Solution | | 8 | 12.4 |
| Modulus of Rupture (Cold) p.s.i.: After 220 F. drying | 1,320 | 930 | 1,250 |
| Modulus of Rupture (Hot) p.s.i.: At 1,800 F | 210 | 290 | 425 |
| Linear Change: After 3,000 F. firing | −0.3 | −0.3 | −2.1 |
| Percent Porosity: | | | |
| After 220 F. drying | 8.7 | 20.2 | 14.1 |
| After 1,800 F. firing | 20.1 | 21.6 | 22.0 |
| After 2,450 F. firing | 20.1 | 20.6 | 21.3 |
| After 3,000 F. firing | 18.2 | 19.5 | 21.9 |
| Bulk Density lb./ft.³: | | | |
| After 220 F. drying | 192 | 168 | 167 |
| After 1,800 F. firing | 184 | 168 | 165 |
| After 2,450 F. firing | 182 | 172 | 168 |
| After 3,000 F. firing | 186 | 175 | 169 |

*Example II*

Effective results are also obtained when in place of the magnesia, 100 parts of a fused, cast grain aggregate is used of 60% magnesia and 40% chrome ore. The compositions are tested for use as a gunning mix, a rammed composition, and a pressed composition. The results are shown in Table II.

TABLE II

|  | Gunned | Rammed | Pressed |
| --- | --- | --- | --- |
| Parts Sequestered Phosphatic Solution | *12 | 12.4 | 7 |
| Modulus of Rupture (Cold) p.s.i.: After 220 F. drying | 400 | 1,150 | 1,245 |
| Modulus of Rupture (Hot) p.s.i.: | | | |
| At 1,800 F | 300 | 370 | 580 |
| At 2,450 F | | | 315 |
| Percent Porosity: | | | |
| After 220 F. drying | 16.7 | 7.2 | 19.8 |
| After 1,800 F. firing | 26.1 | 24.1 | 22.0 |
| After 2,450 F. firing | 27.0 | 23.9 | 22.3 |
| After 3,000 F. firing | | 23.2 | 22.2 |
| Bulk Density lb./ft.³: | | | |
| After 220 F. drying | 173 | 179 | 181 |
| After 1,800 F. firing | 168 | 171 | 180 |
| After 2,450 F. firing | 168 | 173 | 179 |
| After 3,000 F. firing | | 175 | 179 |

*50–50 mixture of sequestered phosphatic solution and water.

*Example III*

Three mixes are prepared using a combination of magnesia and raw dolomite as indicated in the table below, and tempered with sequestered phosphatic solutions. Each tempered mix is vibration cast into a number of two-inch bar molds where the compositions set in approximately 5 minutes. The resultant bars are oven dried and fired to the various temperatures indicated and immediately thereafter various physical properties determined. The various compositions and the results of the various tests are shown below in Table III.

As will be noted from the various test data shown in Table III, various strength properties increase with increased amounts of magnesia and the linear change and porosity decrease with increasing magnesia content. However, the strengths are relatively high for the degree of porosities and linear change on firing shown. Another advantageous property is the fact that there are closed pores in the resultant refractories.

TABLE III

| Mix | Exp. 1 | Exp. 2 | Exp. 3 |
| --- | --- | --- | --- |
| Percent Raw Dolomite: 72%, −6 to +28; 28%, −100 mesh | 90 | 70 | 50 |
| Percent Magnesia 98% purity: Graded grain size, 4 mesh or lower; all tempered with SPS for pressing | 10 | 30 | 50 |
| Modulus of Rupture p.s.i.: | | | |
| After 220 F. drying | 265 | 450 | 600 |
| After 1,800 F. drying | 75 | 100 | 125 |
| After 2,550 F. drying | 120 | 100 | 115 |
| After 2,910 F. drying | 535 | 810 | 920 |
| Hot at 1,800 F | 85 | 115 | 145 |
| Hot at 2,450 F | 85 | 160 | 245 |
| Linear Change, percent: | | | |
| After 1,800 F. firing | +0.2 | +0.2 | −0.1 |
| After 2,550 F. firing | −5.1 | −1.6 | +0.1 |
| After 2,910 F. firing | −14.6 | −9.0 | −4.7 |
| Apparent Porosity, percent: | | | |
| After 1,800 F. firing | 52.5 | 49.2 | 40.8 |
| After 2,550 F. firing | 46.6 | 46.1 | 40.2 |
| After 2,910 F. firing | 37.8 | 36.7 | 36.4 |
| Apparent Specific Gravity: | | | |
| After 1,800 F. firing | 2.46 | 2.89 | 3.05 |
| After 2,550 F. firing | 2.57 | 2.89 | 2.94 |
| After 2,910 F. firing | 3.33 | 3.37 | 3.40 |
| Bulk Density lb./ft.$^3$: | | | |
| After 1,800 F. firing | 72.9 | 91.6 | 112.9 |
| After 2,550 F. firing | 85.5 | 97.4 | 109.7 |
| After 2,910 F. firing | 129.3 | 133.3 | 135.0 |

*Example IV*

The procedure of Example II is repeated with similar results using a spinel (70% magnesia and 30% alumina) as the aggregate.

*Example V*

The procedure of Example II is repeated with similar results using an equal weight of zirconia in place of the raw dolomite.

*Example VI*

The procedure of Example I is repeated using the types and amount of aggregate and amount of sequestered phosphatic solution (SPS) or diammonium phosphate as indicated below in Table IV. The resultant properties, as well as those of the commercial brick of Example I, are also summarized in Table IV. It will be noted that composition No. 2 having the diammonium phosphate has much poorer strength characteristics (modulus of rupture) and porosity than do those made with SPS.

TABLE IV

| Aggregate | 1<br>Fused, Cast,[1] Grain Aggregate | 2<br>Fused, Cast,[1] Grain Aggregate | 3<br>98% Magnesia | 4<br>Comm. Brick |
| --- | --- | --- | --- | --- |
| How processed | Pressed | Pressed | Rammed | |
| Percent P$_2$O$_5$: | | | | |
| As SPS soln | 2.4 | | 4.2 | 0 |
| As diammonium phosphate[2] | | [3] 3.0 | | |
| Modulus of Rupture (p.s.i.) dry | 1,245 | 714 | 1,250 | 1,320 |
| After firing at 1,800 F | 580 | 384 | 425 | 210 |
| After firing at 2,450 F | 315 | 36 | | 210 |
| Linear change after firing at 3,000 F | +0.9 | +0.1 | −2.1 | −0.3 |
| Porosity after firing at 3,000 F | 22.2 | 28.4 | 21.9 | 18.2 |

[1] 60% MgO, 40% Chrome Ore.
[2] Added as dry powder to aggregate and sufficient water added to give proper consistency.

*Example VII*

A dry aggregate of fused, cast grain aggregate of 60% magnesia and 40% chrome ore of the particle size distribution described above is fed to a gun for application to a wall. The type and amounts of liquid mixed with the aggregate is indicated below in Table V. The resultant properties are also given in Table V. As will be noted the modulus of rupture for the phosphate bonded product is superior in each case after firing at 1800° F. as compared to the silicate bonded and in the case where diluted SPS is used it is superior also after firing at 2450° F. It will be noted that the strength characteristics of the composition made with monoammonium phosphate are much poorer than with SPS. Likewise the higher porosity of the monoammonium phosphate product is caused by the faster reaction and faster moisture vaporization which results in steam traps.

These examples illustrate the improved strength at intermediate temperatures in a chemically bonded refractory effected by the process of this invention. By effecting such properties into a chemically bonded refractory it is possible to avoid the much more costly operation of firing the refractory, which is the only previously known method of effecting such properties.

TABLE V

| Liquid used in gunning mix per 100 parts of aggregate | 11.5 pts SPS | 5.6 pts SPS, 4.6 pts H$^2$O | 5.5 pts* monoammonium phosphate | 12 pts of 37% sol. of sodium silicate |
| --- | --- | --- | --- | --- |
| Percent P$_2$O$_5$ | 3.9 | 1.9 | 3.0 | |
| Modulus of Rupture (p.s.i.) dry | 665 | 400 | 313 | 481 |
| After firing at 1,800 F | 452 | 300 | 116 | 97 |
| After firing at 2,450 F | 35 | 100 | 35 | 89 |
| Linear change after firing at 3,000 F | −1.4 | −0.3 | −0.6 | −0.2 |
| Porosity after firing at 3,000 F | 24.5 | 27.0 | 33.3 | 28.0 |
| Panel Spalling after firing at 3,000 F | 8.9 | | 18.4 | 29.9 |

*Mixed as powder in dry aggregate and water added in the gun in sufficient amount to desired consistency.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A process of preparing a refractory composition comprising the steps of
   (a) mixing 100 parts of a refractory aggregate containing at least 1% by weight of magnesia with an aqueous solution of ammonium phosphates in the approximate proportions based on total ammonium phosphates of 35–40% orthophosphate, 45–50% pyrophosphate, 9–11% tripolyphosphate and 2–5% as higher polyphosphates, the amount of said total ammonium phosphates being approximately 1.35–8.55 parts by weight of P$_2$O$_5$ content per 100 parts by weight of aggregate, the ammonium phosphate content being equivalent to about 10 percent by weight ammoniacal nitrogen and about 34 percent by weight $P_2O_5$, said solution having approximately 50 percent by weight of water therein;

(b) shaping the resultant mixture into a desired form and allowing said shaped mixture to set; and (c) thereafter drying the resultant shaped aggregate at a temperature of at least 250° F.

2. A process of claim 1 in which said phosphate content is distributed on a weight basis of approximately 38% as orthophosphate, 48% as pyrophosphate, 10% as tripolyphosphate, 3% as tetrapolyphosphate and 1% as higher polyphosphates.

3. A process of claim 2 in which said aggregate comprises at least 10% by weight of magnesia.

4. A process of claim 2 in which said aggregate comprises 10–50% by weight of magnesia and 50–90% by weight of raw dolomite.

5. A process of claim 2 in which said aggregate comprises 1–5% by weight of magnesia and 95–99% by weight of fire clay aggregate.

6. A process of claim 2 in which said aggregate comprises 1–5% by weight of magnesia and 95–99% by weight of firebrick.

7. A process of claim 2 in which said aggregate comprises 10–50% by weight calcined dolomite and 50–90% by weight of raw dolomite.

8. The process of claim 2 in which said aggregate comprises 5–50% by weight of magnesia and 50–95% of alumina.

9. A process of claim 2 in which said aggregate comprises a fused cast grain aggregate consisting essentially of a major portion of magnesia and a minor proportion of a component selected from the class consisting of alumina and chrome ore.

10. A refractory composition consisting essentially of 100 parts of a refractory aggregate containing at least 1% by weight of magnesia and of 0.5–6% by weight of mixed phosphates calculated as $P_2O_5$ distributed on a weight basis as approximately 35–40% orthophosphate, 45–50% pyrophosphate, 9–11% tripolyphosphate and 2–5% higher polyphosphates.

11. A refractory composition of claim 10 in which said phosphate content is distributed on a weight basis of approximately 38% orthophosphate, 48% pyrophosphate, 10% tripolyphosphate, 3% tetrapolyphosphate and 1% higher polyphosphates.

12. A refractory composition of claim 11 in which said aggregate consists essentially of a fused, cast grain of a major portion of magnesia and a minor portion of chrome ore.

13. A refractory composition of claim 11 in which said aggregate consists essentially of at least 10% by weight of magnesia.

14. A refractory composition of claim 11 in which said aggregate consists essentially of 10–50 percent by weight of a magnesia and 50–90 percent by weight of raw dolomite.

15. A refractory composition of claim 11 in which said aggregate consists essentially of 1–5 percent by weight of magnesia and 95–99 percent by weight of fireclay aggregate.

16. A refractory composition of claim 11 in which said aggregate consists essentially of 1–5 percent by weight of magnesia and 95–99 percent by weight of firebrick.

17. A refractory composition of claim 11 in which said aggregate consists essentially of 10–50% by weight calcined dolomite and 50–90 percent by weight raw dolomite.

18. A refractory composition of claim 11 in which said aggregate consists essentially of a fused cast grain aggregate consisting essentially of a major portion of magnesia and a minor proportion of a component selected from the class consisting of alumina and chrome ore.

19. A refractory composition of claim 11 in which said aggregate consists essentially of 5–50 percent by weight of magnesia and 95–99 percent by weight of silica.

20. A process of claim 1, in which said phosphate content is distributed on a weight basis of approximately 38% as orthophosphate, 48% as pyrophosphate, 10% as tripolyphosphate, 3% as tetrapolyphosphate and 1% as higher polyphosphates, and said aggregate consists essentially of 5–50 percent by weight of magnesia and 95–99 percent by weight of silica.

21. A process of coating a furnace wall with a refractory composition comprising the steps of (a) mixing 100 parts of a refractory aggregate containing at least 1% by weight of magnesia with an aqueous solution of ammonium phosphates in the approximate proportions based on total ammonium phosphates of 35–40% orthophosphate, 45–50% pyrophosphate, 9–11% tripolyphosphate and 2–5% as higher polyphosphates, the amount of said total ammonium phosphates being approximately 1.35–8.55 parts by weight of $P_2O_5$ content per 100 parts by weight of aggregate, the ammonium phosphate content being equivalent to about 10 percent by weight ammoniacal nitrogen and about 34 percent by weight $P_2O_5$, said solution having approximately 50–75 percent by weight of water therein; and (b) substantially simultaneously gunning the resultant mixture on said wall, said wall being at a temperature of at least 250° F.

22. A process of claim 21 in which said phosphate content is distributed on a weight basis of approximately 38% as orthophosphate, 48% as pyrophosphate, 10% as tripolyphosphate, 3% as tetrapolyphosphate and 1% as higher polyphosphates.

References Cited by the Examiner

UNITED STATES PATENTS 2,479,504   8/1949   Moore et al. _____ 106—58

TOBIAS E. LEVOW, *Primary Examiner.*

J. E. POER, *Assistant Examiner.*